US012627620B2

(12) United States Patent
Chiu et al.

(10) Patent No.: US 12,627,620 B2
(45) Date of Patent: May 12, 2026

(54) SYSTEM OF GENERATIVE CHATBOT IN REAL MULTI-PERSON RESPONSE SITUATION AND METHOD THEREOF

(71) Applicants: SQ Technology (Shanghai) Corporation, Shanghai (CN); Inventec Corporation, Taipei City (TW)

(72) Inventors: Chuan-Cheng Chiu, Taipei City (TW); Zhuo-Jia Bian, Shanghai (CN)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 411 days.

(21) Appl. No.: 18/532,592

(22) Filed: Dec. 7, 2023

(65) Prior Publication Data

US 2025/0097170 A1 Mar. 20, 2025

(30) Foreign Application Priority Data

Sep. 15, 2023 (CN) .......................... 202311196405.2

(51) Int. Cl.
*H04L 51/02* (2022.01)
*G10L 13/08* (2013.01)
*G10L 15/26* (2006.01)

(52) U.S. Cl.
CPC .............. *H04L 51/02* (2013.01); *G10L 13/08* (2013.01); *G10L 15/26* (2013.01)

(58) Field of Classification Search
CPC ......... H04L 51/02; G10L 13/08; G10L 15/26; G10L 13/00; G10L 15/22; G10L 25/63

USPC ............................................................. 704/9
See application file for complete search history.

(56) References Cited

U.S. PATENT DOCUMENTS

| | | | | |
|---|---|---|---|---|
| 8,566,263 B2 * | 10/2013 | Flinn | ...................... | G06N 20/00 706/14 |
| 8,589,402 B1 * | 11/2013 | Lampietro | .......... | G06F 16/5866 707/758 |
| 8,954,447 B1 * | 2/2015 | Chatterjee | ........... | G06F 16/4393 715/233 |
| 8,977,620 B1 * | 3/2015 | Buryak | ................. | G06F 16/353 707/758 |
| 9,002,848 B1 * | 4/2015 | Peng | ..................... | G06F 16/355 707/738 |
| 9,111,218 B1 * | 8/2015 | Lewis | ..................... | G06F 16/35 |

(Continued)

*Primary Examiner* — Thuykhanh Le
(74) *Attorney, Agent, or Firm* — David R. Stevens; Stevens Law Group

(57) ABSTRACT

A system of generative chatbot in a real multi-person response situation and a method thereof are disclosed. In the system, speech signals are sensed and converted into feature vectors and text messages, and a timing label and a classification label are embedded into the text messages, the text messages are stored as a context message, so that a server-end host can determine a timing logic of a multi-person conversation, and the context message and the timing logic are transmitted to an artificial intelligence device which determines a current conversation stage, a topic evolution, predicts a conversation development, and actively generates and stores a response message to the server-end host; the server-end host can filter out the response messages and transmit the filtered response message to a portable device for output. Therefore, the technical effect of improving conversational initiative and response efficiency can be achieved.

10 Claims, 6 Drawing Sheets

(56) References Cited

U.S. PATENT DOCUMENTS

| | | | | |
|---|---|---|---|---|
| 9,367,814 | B1 * | 6/2016 | Lewis | G06F 16/353 |
| 10,268,757 | B2 * | 4/2019 | Aikawa | G06F 16/337 |
| 10,275,535 | B1 * | 4/2019 | Trauth | G06F 16/24556 |
| 10,742,934 | B2 * | 8/2020 | DeAngelis | G01S 3/7865 |
| 2006/0010208 | A1 * | 1/2006 | Fujisawa | G06Q 30/02 |
| | | | | 709/206 |
| 2007/0107008 | A1 * | 5/2007 | Dybus | H04N 21/4667 |
| | | | | 725/35 |
| 2007/0118394 | A1 * | 5/2007 | Cahoon | G06Q 30/08 |
| | | | | 705/1.1 |
| 2007/0156656 | A1 * | 7/2007 | Pather | G06F 9/542 |
| 2007/0214471 | A1 * | 9/2007 | Rosenberg | H04H 20/38 |
| | | | | 725/100 |
| 2007/0279494 | A1 * | 12/2007 | Aman | H04N 5/262 |
| | | | | 348/169 |
| 2009/0177541 | A1 * | 7/2009 | Martel | G06Q 30/0212 |
| | | | | 705/14.14 |
| 2009/0271357 | A1 * | 10/2009 | Agarwal | G06F 17/00 |
| | | | | 706/50 |
| 2009/0306966 | A1 * | 12/2009 | Hejna, Jr. | G10L 25/48 |
| | | | | 704/9 |
| 2010/0028845 | A1 * | 2/2010 | Myer | G09B 7/02 |
| | | | | 434/323 |
| 2011/0178797 | A1 * | 7/2011 | Markefka | G10L 15/22 |
| | | | | 704/201 |
| 2011/0289422 | A1 * | 11/2011 | Spivack | G06F 16/951 |
| | | | | 715/739 |
| 2012/0053929 | A1 * | 3/2012 | Hsia | G16H 50/30 |
| | | | | 704/9 |
| 2012/0101807 | A1 * | 4/2012 | Heo | G06F 16/3331 |
| | | | | 704/9 |
| 2012/0301032 | A1 * | 11/2012 | Kawanishi | G06F 16/583 |
| | | | | 382/190 |
| 2013/0091582 | A1 * | 4/2013 | Chen | G06F 21/60 |
| | | | | 726/26 |
| 2013/0226910 | A1 * | 8/2013 | Work | G06F 16/24578 |
| | | | | 707/722 |
| 2014/0075004 | A1 * | 3/2014 | Van Dusen | G06Q 10/10 |
| | | | | 709/223 |
| 2014/0189056 | A1 * | 7/2014 | St. Clair | H04L 67/55 |
| | | | | 709/217 |
| 2014/0189524 | A1 * | 7/2014 | Murarka | G06Q 10/40 |
| | | | | 715/744 |
| 2014/0189539 | A1 * | 7/2014 | St. Clair | G06F 3/048 |
| | | | | 715/753 |
| 2014/0317646 | A1 * | 10/2014 | Garza | H04N 21/41265 |
| | | | | 725/12 |
| 2014/0325540 | A1 * | 10/2014 | Garza | H04N 21/4788 |
| | | | | 725/12 |
| 2014/0331242 | A1 * | 11/2014 | De La Garza | H04N 21/44218 |
| | | | | 725/12 |
| 2014/0337868 | A1 * | 11/2014 | Garza | H04N 21/4223 |
| | | | | 725/12 |
| 2015/0032443 | A1 * | 1/2015 | Karov | G06F 40/35 |
| | | | | 704/9 |
| 2015/0143260 | A1 * | 5/2015 | Bailey | G06Q 10/40 |
| | | | | 715/753 |
| 2015/0149153 | A1 * | 5/2015 | Werth | G06F 40/30 |
| | | | | 704/9 |
| 2015/0160808 | A1 * | 6/2015 | Walkin | G06F 3/0481 |
| | | | | 715/800 |
| 2015/0160832 | A1 * | 6/2015 | Walkin | G06F 3/0488 |
| | | | | 715/765 |
| 2015/0297949 | A1 * | 10/2015 | Aman | G06T 7/246 |
| | | | | 348/157 |
| 2015/0382058 | A1 * | 12/2015 | Humes | G06Q 30/0241 |
| | | | | 725/8 |
| 2016/0080294 | A1 * | 3/2016 | Alkov | H04L 67/1097 |
| | | | | 709/206 |
| 2016/0162173 | A1 * | 6/2016 | Chandra | G06F 3/04842 |
| | | | | 715/747 |
| 2016/0321229 | A1 * | 11/2016 | Baird | G06F 40/169 |
| 2016/0358629 | A1 * | 12/2016 | Pribula | H04N 5/772 |
| 2018/0253704 | A1 * | 9/2018 | Unnerstall | G06Q 20/385 |
| 2019/0273954 | A1 * | 9/2019 | Evans | H04N 21/25883 |
| 2021/0133487 | A1 * | 5/2021 | Bastide | G06F 16/9024 |
| 2021/0150489 | A1 * | 5/2021 | Haramati | G06F 16/252 |
| 2021/0157978 | A1 * | 5/2021 | Haramati | G06F 7/14 |
| 2021/0166813 | A1 * | 6/2021 | Maher | G16B 5/00 |
| 2022/0027559 | A1 * | 1/2022 | Wang | G06F 40/289 |
| 2022/0180297 | A1 * | 6/2022 | Perincherry | G06Q 10/063118 |
| 2023/0057428 | A1 * | 2/2023 | Schnell | A61K 39/215 |
| 2023/0109411 | A1 * | 4/2023 | Poulsen | G06F 16/31 |
| | | | | 707/722 |
| 2023/0140125 | A1 * | 5/2023 | Glesinger | G06N 3/08 |
| | | | | 704/9 |
| 2023/0196116 | A1 * | 6/2023 | Liss | G06N 7/01 |
| | | | | 706/25 |
| 2023/0237270 | A1 * | 7/2023 | Su | H04L 12/1831 |
| | | | | 704/9 |
| 2023/0248998 | A1 * | 8/2023 | Natarajan | G16H 30/20 |
| | | | | 600/1 |
| 2023/0410801 | A1 * | 12/2023 | Mishra | H04L 51/02 |
| 2024/0039905 | A1 * | 2/2024 | Talavera | G06F 16/25 |
| 2024/0223520 | A1 * | 7/2024 | Heikkinen | H04L 51/02 |
| 2024/0404428 | A1 * | 12/2024 | Gangjee | G09B 21/00 |
| 2024/0406124 | A1 * | 12/2024 | Cunningham | G06F 40/30 |

* cited by examiner

Figure 2A:
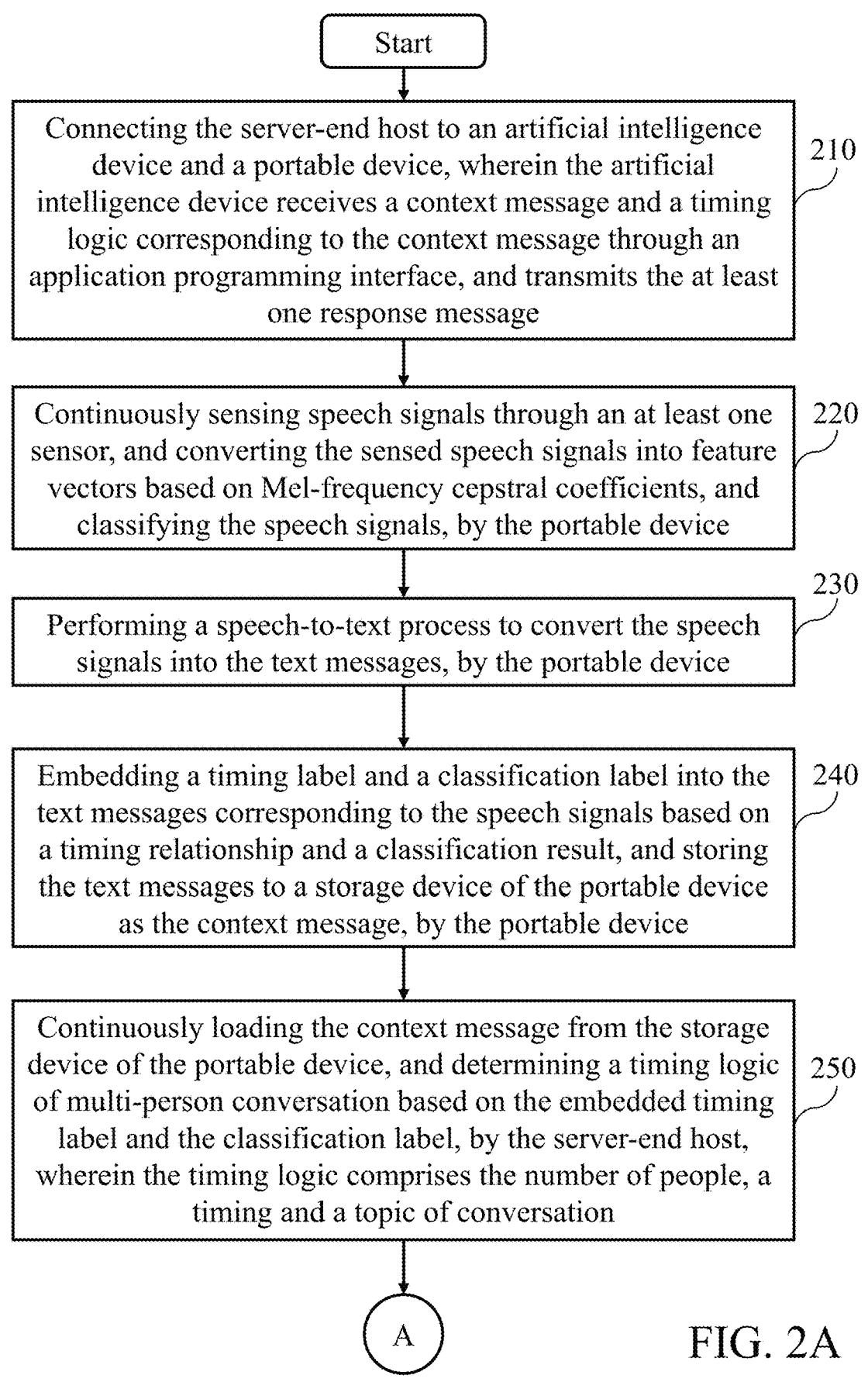

Start

Connecting the server-end host to an artificial intelligence device and a portable device, wherein the artificial intelligence device receives a context message and a timing logic corresponding to the context message through an application programming interface, and transmits the at least one response message          210

Continuously sensing speech signals through an at least one sensor, and converting the sensed speech signals into feature vectors based on Mel-frequency cepstral coefficients, and classifying the speech signals, by the portable device          220

Performing a speech-to-text process to convert the speech signals into the text messages, by the portable device          230

Embedding a timing label and a classification label into the text messages corresponding to the speech signals based on a timing relationship and a classification result, and storing the text messages to a storage device of the portable device as the context message, by the portable device          240

Continuously loading the context message from the storage device of the portable device, and determining a timing logic of multi-person conversation based on the embedded timing label and the classification label, by the server-end host, wherein the timing logic comprises the number of people, a timing and a topic of conversation          250

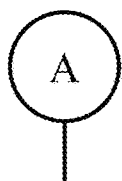

Transmitting the context message and the timing logic to the artificial intelligence device to input the context message and the timing logic into a large language model of the artificial intelligence device, to generate the response message, by the server-end host, and transmitting the generated response message to the server-end host through the application programming interface, by the artificial intelligence device                                        260

Storing the response message to a response list, automatically selecting at least one of the response messages in the response list as an on-demand chat message, and transmitting the on-demand chat message to the portable device, by the server-end host                                        270

When the portable device receives the on-demand chat message, performing a text-to-speech process to convert the on-demand chat message into the feedback speech, and outputting the feedback speech through a speaker, by the portable device                                        280

End

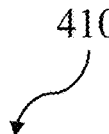

| Timing Label | Classification Label | Text |
|---|---|---|
| AM 11:50:00 | A | Lunch time is coming. |
| AM 11:50:10 | B | What would you all like to eat for lunch? |
| AM 11:50:25 | C | Pork chop rice. |

420

Number of people in conversation: 3
Conversation Topic: Discussing Lunch
Dialogue timing:
01 -> 02 -> 03

430

Number of people in conversation: 3
Conversation Topic: Discussing Lunch
Dialogue timing:
AM 11:50:00 A：Lunch time is coming.
AM 11:50:10 B：What would you all like to eat for lunch?
AM 11:50:25 C：Pork chop rice.

Pork chop rice sounds good! I also want to eat pork chop rice. Is there any salad or soup to go with it?

I want to eat curry rice. Is anyone willing to join me?

I'd like to try something light today, are there any salad or sandwich options?

I want to eat chicken chop rice.

SYSTEM OF GENERATIVE CHATBOT IN REAL MULTI-PERSON RESPONSE SITUATION AND METHOD THEREOF

CROSS-REFERENCE TO RELATED APPLICATION

This application claims the benefit of Chinese Application Serial No. 202311196405.2, filed Sep. 15, 2023, which is hereby incorporated herein by reference in its entirety.

BACKGROUND OF THE INVENTION

1. Field of the Invention

The present invention relates to a chatbot system and a method thereof, and more particularly to a system of generative chatbot in a real multi-person response situation and a method thereof.

2. Description of the Related Art

In recent years, with the popularity and vigorous development of artificial intelligence, various artificial intelligence applications have sprung up. Among the developed artificial intelligence applications, chatbots attract the most attention.

Generally speaking, the conventional chatbot usually have one-to-one conversation with a user, that is, only when the user sends a question, the conventional chatbot can respond according to the question. However, no conventional chatbot is able to actively give appropriate response suggestions or prompts in a real multi-person response situation, for example, in a multi-person conversation environment, the conventional chatbot is unable to proactively and quickly give users appropriate conversation suggestions. Therefore, the conventional chatbot has problems of poor chat initiative and response efficiency.

According to above-mentioned contents, what is needed is to develop an improved solution to solve the conventional problems of poor chat initiative and response efficiency.

SUMMARY OF THE INVENTION

An objective of the present invention is to disclose a system of generative chatbot in a real multi-person response situation and a method thereof, to solve the conventional problems.

In order to achieve the objective, the present invention provides a system of generative chatbot in a real multi-person response situation. The system includes an artificial intelligence device, a portable device and a server-end host. The artificial intelligence device is configured to receive a context message and a timing logic corresponding to the context message through an application programming interface, input the context message and the timing logic to a large language model to generate at least one response message, and transmit the at least one response message through the application programming interface. The portable device includes a sensor, a speaker, a storage device and a speech processor. The sensor is configured to continuously sense speech signals. The speaker is configured to output a feedback speech. The storage device is configured to store feature vectors and text messages corresponding to the speech signals, wherein each of the text messages comprises a timing label and a classification label. The speech processor is electrically connected to the sensor, the speaker, and the storage device, and configured to convert the sensed speech signals into the feature vectors based on Mel-frequency cepstral coefficients, and classify the speech signals, perform a speech-to-text (STT) process to convert the speech signals into the text messages, embed the timing label and the classification label into the text messages corresponding to the speech signals based on a timing relationship and a classification result, and store the text messages to the storage device as the context message, and when an on-demand chat message is received, perform a text-to-speech process to convert the on-demand chat message into the feedback speech, and output the feedback speech through the speaker. a server-end host is connected to the artificial intelligence device and the portable device, and includes a non-transitory computer-readable storage medium and a hardware processor. The non-transitory computer-readable storage medium is configured to store computer readable instructions. The hardware processor is electrically connected to the non-transitory computer-readable storage medium, and configured to execute the computer readable instructions to make the server-end host execute: continuously loading the context message from the storage device of the portable device, and determining a timing logic of a multi-person conversation based on the embedded timing label and the classification label, wherein the timing logic comprises the number of people, a timing and a topic of conversation; transmitting the context message and the timing logic to the artificial intelligence device, receiving the response message from the artificial intelligence device, and storing the response message into a response list; automatically selecting at least one of the response messages in the response list as the on-demand chat message, and transmitting the on-demand chat message to the portable device.

In order to achieve the objective, the present invention provides a method of generative chatbot in a real multi-person response situation, and the method includes steps of: connecting the server-end host to an artificial intelligence device and a portable device, wherein the artificial intelligence device receives a context message and a timing logic corresponding to the context message through an application programming interface, and transmits the at least one response message; continuously sensing speech signals through an at least one sensor, and converting the sensed speech signals into feature vectors based on Mel-frequency cepstral coefficients, and classifying the speech signals, by the portable device; performing a speech-to-text process to convert the speech signals into the text messages, by the portable device; embedding a timing label and a classification label into the text messages corresponding to the speech signals based on a timing relationship and a classification result, and storing the text messages to a storage device of the portable device as the context message, by the portable device; continuously loading the context message from the storage device of the portable device, and determining a timing logic of multi-person conversation based on the embedded timing label and the classification label, by the server-end host, wherein the timing logic comprises the number of people, a timing and a topic of conversation; transmitting the context message and the timing logic to the artificial intelligence device to input the context message and the timing logic into a large language model of the artificial intelligence device, to generate the response message, by the server-end host, and transmitting the generated response message to the server-end host through the application programming interface, by the artificial intelligence device; storing the response message to a response list, automatically selecting at least one of the response messages in the response list as an on-demand chat message, and transmitting the on-demand chat message to the portable device, by the server-end host; when the portable device receives the on-demand chat message, performing a text-to-speech process to convert the on-demand chat message into the feedback speech, and outputting the feedback speech through a speaker, by the portable device.

According to the above-mentioned system and method of the present invention, the difference between the present invention and the conventional technology is that, in the present invention, the speech signals are sensed and converted into the feature vectors and the text messages; the timing label and the classification label are embedded into the text messages, the text messages are stored as the context message, so that a server-end host can determine the timing logic of the multi-person conversation, and the context message and the timing logic are transmitted to the artificial intelligence device which determines the current conversation stage, the topic evolution, predicts the conversation development, and actively generates and stores the response message to the server-end host; the server-end host can filter out the response messages and transmit the filtered response message to the portable device for output.

Therefore, the technical effect of improving conversational initiative and response efficiency can be achieved.

BRIEF DESCRIPTION OF THE DRAWINGS

The structure, operating principle and effects of the present invention will be described in detail by way of various embodiments which are illustrated in the accompanying drawings.

FIGS. 2A and 2B are flowcharts of a method of generative chatbot in a real multi-person response situation, according to the present invention.

FIG. 4 is a schematic view of a context message and a timing logic of the present invention.

DETAILED DESCRIPTION OF THE PREFERRED EMBODIMENTS

Figure 1:
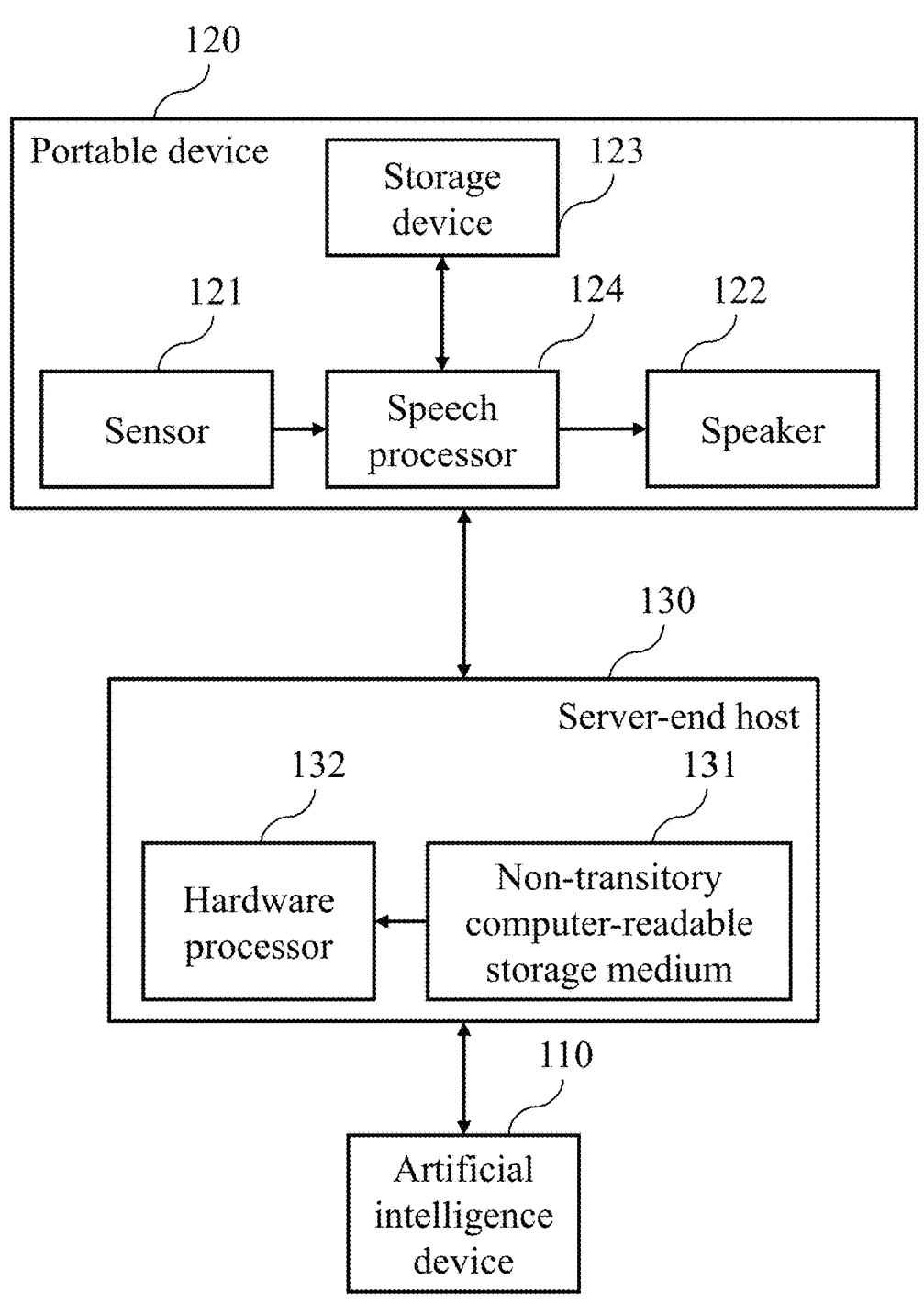
FIG. 1 is a block diagram of a system of generative chatbot in a real multi-person response situation, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a block diagram of a system of generative chatbot in a real multi-person response situation, according to the present invention. The system includes an artificial intelligence device 110, a portable device 120, and a server-end host 130. The artificial intelligence device 110 is configured to receive a context message and a timing logic corresponding to the context message through an application programming interface, input the context message and the timing logic to a large language model to generate a response message, and transmit the response message through the application programming interface. In actual implementation, the artificial intelligence device 110 is a chatbot using a large language model; the large language model can be, for example, generative pre-trained transformer (GPT), PaLM, Galactica, LLaMA, LaMDA or the like. The artificial intelligence device 110 determines a current stage and a topic evolution of conversation, and predicts conversation development based on the context message and the corresponding timing logic, and uses the predicted conversation as a response message.

The portable device 120 includes a sensor 121, a speaker 122, a storage device 123, and a speech processor 124. The sensor 121 is configured to continuously sense speech signals. In actual implementation, the sensor 121 also senses at least one of user's physiological statuses, facial expressions and body movements to generate a user behavior message, and transmits the user behavior message to the server-end host 130, so that the server-end host 130 determines the user's personality to set the personality parameter. For example, the sensor 121 can sense at least one physiological feature (such as blood pressure, heartbeat, or blood sugar) to determine a physiological status (such as happy status, excited status, frustrated status), or the sensor 121 can sense face or iris to determine a facial expression and mood, so that the user's personality can be determined based on the physiological status, facial expressions and mood (such as extroversion, introversion, enthusiasm, or cool).

The speaker 122 is configured to output a feedback speech. In actual implementation, the speaker can be a headphone, a speaker, or the like. In addition, the portable device 120 can include a display device; when the speaker 122 outputs the feedback speech, the display device can display the on-demand chat message synchronously. In actual implementation, the portable device can include, for example, a displayer, dot-matrix LED display, or the like.

The storage device 123 is configured to store feature vectors and text messages corresponding to the speech signals. Each text message has a timing label and a classification label. In actual implementation, the storage device 123 can include a hard disk, an optical disk, a flash memory or the like. In addition, the storage device 123 uses the text message embedded with the timing label and the classification label as the context message.

The speech processor 124 is electrically connected to the sensor 121, the speaker 122, and the storage device 123. The speech processor 124 converts the sensed speech signals into the corresponding feature vectors based on Mel-frequency cepstral coefficients, classifies the speech signals, performs a speech-to-text process (STT) to convert the speech signals into the text messages, embeds the timing label and the classification label into the text message corresponding to the speech signal based on a timing relationship and a classification result, and stores the text message to the storage device 123. When receiving an on-demand chat message, the speech processor 124 performs a text-to-speech process to convert the on-demand chat message into the feedback speech and outputs the feedback speech through the speaker. For example, the feedback speech can be outputted through a wired or wireless (Bluetooth) headset, speaker or the like. In actual implementation, the speech processor 124 can be implemented by a processor dedicated for processing the speech signal, such as digital signal processor. In addition, the portable device 120 converts the user's speech signals into the feature vectors based on Mel-frequency cepstral coefficients, and transmits the feature vectors to the server-end host 130, so that the server-end host 130 compares the received feature vectors with preset personality feature vectors to determine the user's personality, and sets the personality parameters based on a determination result.

The server-end host 130 is connected to the artificial intelligence device 110 and the portable device 120. The server-end host 130 includes a non-transitory computer-readable storage medium 131 and a hardware processor 132. The non-transitory computer-readable storage medium is configured to store computer readable instructions. In actual implementation, the server-end host 130 can execute the computer readable instructions, and the computer readable instructions used to perform the operations of the present invention can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C #, Perl, Ruby or PHP; the programming language can include regular procedural programming languages, such as C language or similar programming languages.

The hardware processor 132 is electrically connected to the non-transitory computer-readable storage medium 131. The hardware processor 132 executes the computer readable instructions, to make the server-end host 130 execute following operations. The server-end host 130 continuously loads the context message from the storage device 123 of the portable device 120, and determines a timing logic of multi-person conversation based on the embedded timing label and the classification label. The timing logic includes the number of people, a timing and a topic of conversation. The server-end host 130 transmits the context message and the timing logic to the artificial intelligence device 110, receives the response message from the artificial intelligence device 110, stores the response message into a response list, automatically selects at least one of the response messages in the response list as the on-demand chat message, and transmits the on-demand chat message to the portable device 120. In actual implementation, the hardware processor 132 can be a central processing unit, a microprocessor, or the like. In addition, for determining the timing logic of multi-person conversation, the number of people can be determined based on a classification quantity of the classification labels, a conversation sequence can be determined based on the timing label, a topic can be determined based on a content of the context message, such as a time point and a key word; for example, in a condition that the time is noon and the key word is "what to eat", the topic can be determined as a discussion for lunch. In addition, the on-demand chat message can be a response message which is randomly filtered out from the response list and matches the personality parameter. The portable device 120 is permitted to link with the server-end host 130 to set the personality parameter.

It is to be particularly noted that, in actual implementation, the present invention can be implemented fully or partly based on hardware, for example, one or more component of the system can be implemented by integrated circuit chip, system on chip (SOC), a complex programmable logic device (CPLD), or a field programmable gate array (FPGA). The non-transitory computer-readable storage medium of the present invention carries computer-readable instructions (or computer program instructions) for causing the processor to implement concepts of the present invention. The non-transitory computer-readable storage medium can be a tangible device that can hold and store instructions for use by an instruction execution device. The computer-readable storage medium can be a tangible apparatus for holding and storing the instructions executable of an instruction executing apparatus. The non-transitory computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium can include a hard disk, an RAM memory, a read-only-memory, a flash memory, an optical disk, a floppy disc or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus.

Please refer to FIGS. 2A and 2B, which are flowcharts of a method of generative chatbot in a real multi-person response situation, according to the present invention. As shown in FIG. 2A and FIG. 2B, the method of generative chatbot in a real multi-person response situation includes the following steps. In a step 210, the server-end host 130 is connected to an artificial intelligence device 110 and a portable device 120, wherein the artificial intelligence device 110 receives a context message and a timing logic corresponding to the context message through an application programming interface, and transmits the at least one response message. In a step 220, the portable device 120 continuously senses speech signals through an at least one sensor, and converts the sensed speech signals into feature vectors based on Mel-frequency cepstral coefficients, and classifies the speech signals. In a step 230, the portable device 120 performs a speech-to-text process to convert the speech signals into the text messages. In a step 240, the portable device 120 embeds a timing label and a classification label into the text messages corresponding to the speech signals based on a timing relationship and a classification result, and stores the text messages to a storage device 123 of the portable device 120 as the context message. In a step 250, the server-end host 130 continuously loads the context message from the storage device 123 of the portable device 120, and determines a timing logic of multi-person conversation based on the embedded timing label and the classification label, wherein the timing logic comprises the number of people, a timing and a topic of conversation. In a step 260, the server-end host 130 transmits the context message and the timing logic to the artificial intelligence device 110 to input the context message and the timing logic into a large language model of the artificial intelligence device 110, to generate the response message, and the artificial intelligence device 110 transmits the generated response message to the server-end host 130 through the application programming interface. In a step 270, the server-end host 130 stores the response message to a response list, automatically selects at least one of the response messages in the response list as an on-demand chat message, and transmits the on-demand chat message to the portable device 120. In a step 280, when the portable device 120 receives the on-demand chat message, the portable device 120 performs a text-to-speech process to convert the on-demand chat message into the feedback speech, and outputting the feedback speech through the speaker 122. Through aforementioned steps, the speech signals are sensed and converted into the feature vectors and the text messages; the timing label and the classification label are embedded into the text messages, the text messages are stored as the context message, so that a server-end host 130 can determine the timing logic of the multi-person conversation, and the context message and the timing logic are transmitted to the artificial intelligence device 110 which determines the current conversation stage, the topic evolution, predicts the conversation development, and actively generates and stores the response message to the server-end host 130; the server-end host 130 can filter out the response messages and transmit the filtered response message to the portable device 120 for output.

Therefore, the technical effect of improving conversational initiative and response efficiency can be achieved.

Figure 3:
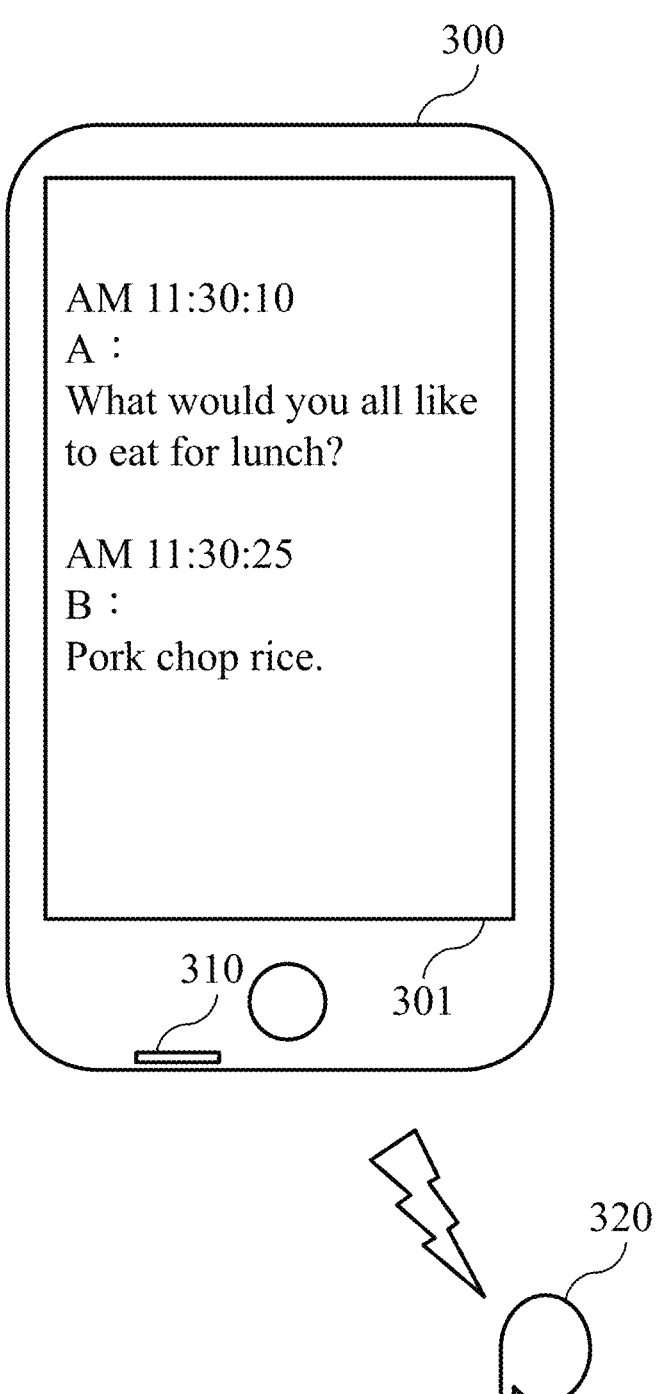
FIG. 3 is a schematic view of a portable device according to an application of the present invention.

The embodiment of the present invention will be illustrated with reference to FIG. 3 to FIG. 5. As shown in FIG. 3, which is a schematic view of a portable device according to an application of the present invention. In actual implementation, the portable device 120 can be a portable device with a voice recording function, such as a smartphone 300, a voice recorder, a personal digital assistant (PDA). The portable device is equipped with a sensor (such as a microphone) having voice recording function to continuously sense human speech signals and the portable device can convert the sensed speech signals into the feature vectors through MFCC technology to classify the speech signals. For example, the smartphone 300 obtains speech signals through the microphone 310 recording voice, and converts the speech signals to obtain three feature vectors, it indicates that there are three people who may be having a conversation. The smartphone 300 performs an STT processing to convert each of the speech signals into a text message, and embeds the corresponding timing label and classification label into the text message based on timing and classification. For example, the timing label includes time, date, and so on. The classification label includes at least one of texts, numbers, symbols for indicating different persons; for example, "A" represents the first person and "B" represents the second person, and so on; or "U01" represents the first person and "U02" represents the second person, and so on. In particular, when the microphone 310 continues to receive speech signals, the smartphone 300 continuously converts the received speech signals into the corresponding feature vectors and text messages, embeds the timing label and the classification label into each text message, and uses all text messages or certain text message matching a specified time interval (such as within 30 minutes) stored in the storage device 123 as the context message. Therefore, the server-end host 130 can continuously load the context message from the storage device 123 to determine the timing logic of the multi-person conversation, the timing logic includes the number of people, the timing and the topic of conversation. Determining the number of people can be based on the number of types of classification labels, for example, three types of classification labels indicates three people. The timing label can be used to determine the timing of conversations. The frequencies of occurrence of keywords or words or a time point in the content of context message can be used to determine the topic. For example, when food or catering words are mentioned at noon, the topic can be determined to be a discussion of lunch. In actual implementation, as shown in FIG. 3, the context message can be displayed on the display device 301 of smartphone 300 in time sequence. In addition, the smartphone 300 can output the feedback speech through the Bluetooth headset 320.

As shown in FIG. 4, which is a schematic view of a context message and a timing logic of the present invention. In actual implementation, the context message 410 includes a timing label, a classification label, and a text message. Based on the context message 410, the server-end host 130 determines the sequence of conversation based on the timing label (that is, the conversation timing), and sets unique serial numbers to differentiate the conversations, for example, the record "01→02→03" indicates the sequence of the text messages. The number of people in conversation can be determined based on the classification labels, for example, when there are three classification labels of "A", "B", and "C", it can be determined that there are three people in conversation. Based on key word "lunch" and the time point (such as the time interval in noon), it can be determined that the conversation topic is about lunch. In this case, the server-end host 130 generates the corresponding timing logic 420 based on a determination result. In particular, in actual implementation, besides the above-mentioned example, the context message 410 and the timing logic 420 can be integrated together such as the context message 430 with timing logic shown in FIG. 4. In addition, when the context message and the timing logic are transmitted to the artificial intelligence device 110 to obtain the response message, the classification assignment of the classification label can be set for generating a response message particularly for the person in this classification; for example, in order to obtain the response message for "A", a request of "please generate the message for response to the A" can be added and transmitted to the artificial intelligence device 110 when the context message and the timing logic are transmitted, so that the artificial intelligence device 110 can transmit at least one response message to the server-end host 130 based on the context message and the timing logic, and the at least one response message are stores in the response list; in an embodiment, when the above-mentioned request is added, only the response message meeting the above-mentioned request is transmitted back; in an embodiment, when conversation topic is changed, the instruction can be used to request particular conversation topic, so as to achieve the effect of cross-topic response. For example, when the context message and the timing logic is transmitted, the request for generating the message to respond "A" in a condition that the conversation topic is "M" is added at the same time, and "M" means different conversation topic, such as a discussion topic about lunch or drink, so that the user can assign a certain conversation topic to prompt and respond. In actual implementation, the above-mentioned request can be inputted or set through the portable device 120, for example, the above-mentioned request can be set by inputting voice or typing texts, numbers or symbols.

Figure 5:
FIG. 5 is a schematic view showing an operation of actively filtering out a response message from a response list, according to an application of the present invention.

As shown in FIG. 5, which is a schematic view showing an operation of actively filtering a response message from a response list, according to an application of the present invention. In a condition that the response list 500 stores response messages, the server-end host 130 can filter out a response message matching the personality parameter from the stored response messages as the on-demand chat message; for example, in a condition that the personality parameter is set as "cool", the server-end host 130 excludes the response message with extended dialogue or guided dialogue (such as the dialogue containing a question mark) when selecting the on-demand chat message; for example, in this case, the server-end host 130 selects "I want to eat chicken chop rice" as the on-demand chat message, and transmits the on-demand chat message to the portable device 120. The on-demand chat is converted into the feedback speech, and the feedback speech is outputted by the speaker 122 of the portable device 120, such as the Bluetooth headset 320 connected to the smartphone 300 as shown in FIG. 3. In actual implementation, the personality parameter can be set by a user, or the server-end host 130 determines the user's personality based on the user behavior message sensed by the portable device 120 to set the personality parameter, or the server-end host 130 compares the user feature vectors with the preset personality feature vectors to determine the user's personality and set the personality parameter. For example, the feature vectors of a low voice are determined as personality feature vectors representing a cool personality, and the feature vectors of a high voice are determined as personality feature vectors representing a passionate personality. When the feature vectors of the voice of the user of the portable device 120 match the personality feature vectors representing a cool emotion, the server-end host 130 sets the personality parameter of the user of the portable device 120 as "cool".

According to above-mentioned contents, the difference between the present invention and the conventional technology is that, in the present invention, the speech signals are sensed and converted into the feature vectors and the text messages; the timing label and the classification label are embedded into the text messages, the text messages are stored as the context message, so that a server-end host can determine the timing logic of the multi-person conversation, and the context message and the timing logic are transmitted to the artificial intelligence device which determines the current conversation stage, the topic evolution, predicts the conversation development, and actively generates and stores the response message to the server-end host; the server-end host can filter out the response messages and transmit the filtered response message to the portable device for output.

Therefore, the above-mentioned solution of the present invention is able to solve the conventional problem, so as to achieve the technical effect of improving conversational initiative and response efficiency.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A system of generative chatbot in a real multi-person response situation, comprising:
    an artificial intelligence device, configured to receive a context message and a timing logic corresponding to the context message through an application programming interface, input the context message and the timing logic to a large language model to generate at least one response message, and transmit the at least one response message through the application programming interface;
    a portable device, comprising:
        at least one sensor, configured to continuously sense speech signals;
        a speaker, configured to output a feedback speech;
        a storage device, configured to store feature vectors and text messages corresponding to the speech signals, wherein each of the text messages comprises a timing label and a classification label; and
        a speech processor, electrically connected to the sensor, the speaker, and the storage device, and configured to:
            convert the sensed speech signals into the feature vectors based on Mel-frequency cepstral coefficients, and classify the speech signals based on the feature vector;
            perform a speech-to-text (STT) process to convert the speech signals into the text messages;
            embed the timing label and the classification label into the text messages corresponding to the speech signals based on a timing relationship and a classification result, and store the text messages to the storage device as the context message; and
            when an on-demand chat message is received, perform a text-to-speech process to convert the on-demand chat message into the feedback speech, and output the feedback speech through the speaker; and
    a server-end host, connected to the artificial intelligence device and the portable device, and comprising:

a non-transitory computer-readable storage medium configured to store computer readable instructions; and a hardware processor, electrically connected to the non-transitory computer-readable storage medium, and configured to execute the computer readable instructions to make the server-end host execute:

continuously loading the context message from the storage device of the portable device, and determining a timing logic of a multi-person conversation based on the embedded timing label and the embedded classification label, wherein the timing logic comprises the number of people, a timing and a topic of conversation;

transmitting the context message and the timing logic to the artificial intelligence device, receiving the response message from the artificial intelligence device, and storing the response message into a response list; and automatically selecting at least one of response messages in the response list as the on-demand chat message based on a personality parameter, and transmitting the on-demand chat message to the portable device.

2. The system of generative chatbot in real multi-person response situation according to claim 1, wherein the on-demand chat message is the response message randomly filtered out from the response list and matching the personality parameter, and the portable device is permitted to link with the server-end host to set the personality parameter.

3. The system of generative chatbot in real multi-person response situation according to claim 2, wherein the sensor is configured to sense at least one of user's physiological statuses, facial expressions and body movements to generate a user behavior message, the portable device transmits the user behavior message to the server-end host, and the server-end host determines a user's personality to set the personality parameter.

4. The system of generative chatbot in real multi-person response situation according to claim 2, wherein the portable device converts the speech signals of a user into the feature vectors and transmits the feature vectors to the server-end host, the server-end host compares the received feature vector with preset personality feature vectors to determine a personality of the user, and set the personality parameter based on the personality of the user.

5. The system of generative chatbot in real multi-person response situation according to claim 1, wherein the portable device comprises a display device configured to display the on-demand chat message synchronously when the speaker outputs the feedback speech.

6. A method of generative chatbot in a real multi-person response situation, comprising:

connecting a server-end host to an artificial intelligence device and a portable device, wherein the artificial intelligence device receives a context message and a timing logic corresponding to the context message through an application programming interface, and transmits at least one response message;

continuously sensing, by the portable device, speech signals through an at least one sensor, and converting the sensed speech signals into feature vectors based on Mel-frequency cepstral coefficients, and classifying the speech signals based on the feature vector;

performing, by the portable device, a speech-to-text (STT) process to convert the speech signals into text messages;

embedding, by the portable device, a timing label and a classification label into the text messages corresponding to the speech signals based on a timing relationship and a classification result, and storing the text messages to a storage device of the portable device as the context message;

continuously loading the context message from the storage device of the portable device, and determining a timing logic of multi-person conversation based on the embedded timing label and the embedded classification label, wherein the timing logic comprises the number of people, a timing and a topic of conversation;

transmitting, by the server-end host, the context message and the timing logic to the artificial intelligence device to input the context message and the timing logic into a large language model of the artificial intelligence device, to generate, by the artificial intelligence device, the response message, and transmitting, by the artificial intelligence device, the generated response message to the server-end host through the application programming interface;

storing, by the server-end host, the response message to a response list, automatically selecting at least one of response messages in the response list as an on-demand chat message based on a personality parameter, and transmitting the on-demand chat message to the portable device; and when the portable device receives the on-demand chat message, performing, by the portable device, a text-to-speech process to convert the on-demand chat message into a feedback speech, and outputting the feedback speech through a speaker of the portable device.

7. The method of generative chatbot in real multi-person response situation according to claim 6, wherein the on-demand chat message is the response message randomly filtered out from the response list and matching the personality parameter, and the portable device is permitted to link with the server-end host to set the personality parameter.

8. The method of generative chatbot in real multi-person response situation according to claim 7, wherein the sensor is configured to sense at least one of user's physiological statuses, facial expressions and body movements to generate a user behavior message, the portable device transmits the user behavior message to the server-end host, and the server-end host determines a user's personality to set the personality parameter.

9. The method of generative chatbot in real multi-person response situation according to claim 7, wherein the portable device converts the speech signals of a user into the feature vectors and transmits the feature vectors to the server-end host, the server-end host compares the received feature vector with preset personality feature vectors to determine the personality of the user, and set the personality parameter based on the personality of the user.

10. The method of generative chatbot in real multi-person response situation according to claim 6, wherein the portable device comprises a display device configured to display the on-demand chat message synchronously when the speaker outputs the feedback speech.

* * * * *